July 19, 1966   P. S. SCHMIDT   3,261,420
GROUND EFFECT MACHINE
Filed Nov. 9, 1964
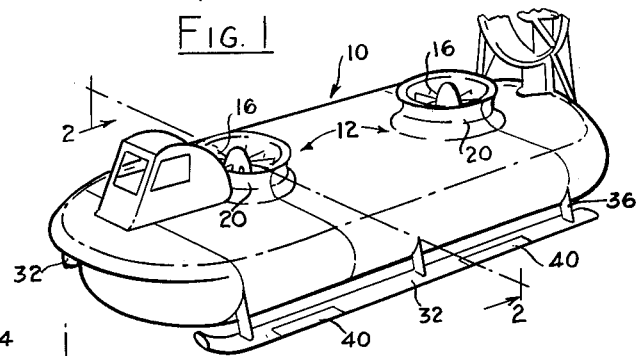
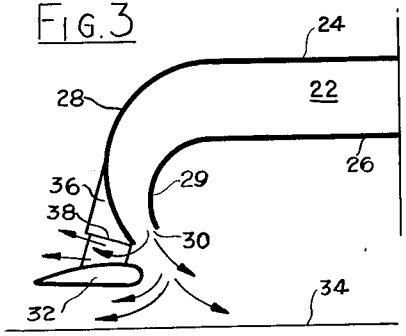
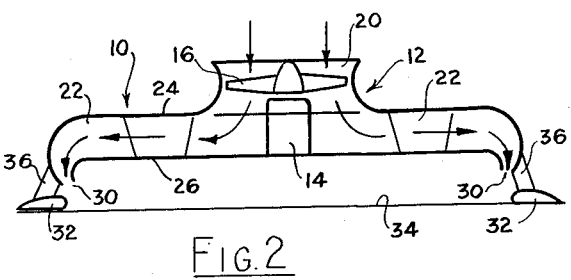
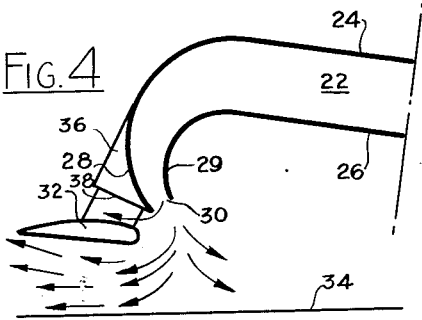
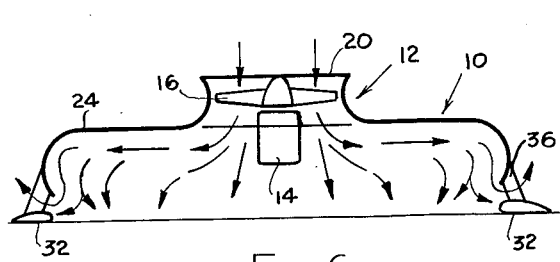
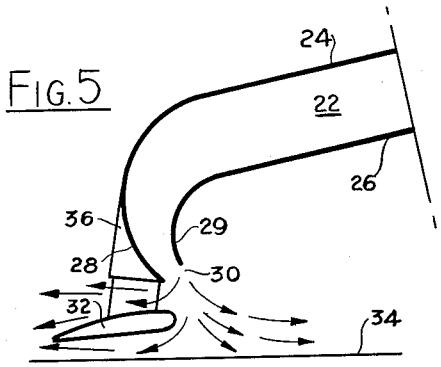
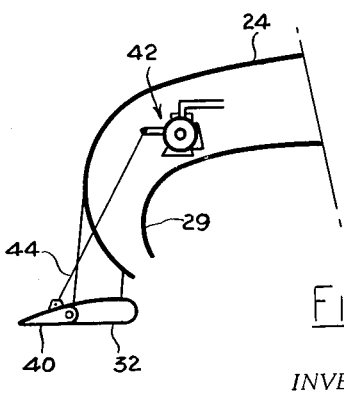
INVENTOR.
PHILIP S. SCHMIDT
BY
Bean, Brooks, Buckley & Bean
ATTORNEYS United States Patent Office 3,261,420
Patented July 19, 1966

3,261,420
GROUND EFFECT MACHINE
Philip S. Schmidt, Palo Alto, Calif., assignor to Bell
Aerospace Corporation, Wheatfield, N.Y.
Filed Nov. 9, 1964, Ser. No. 409,713
6 Claims. (Cl. 180—7)

This invention relates to vehicles of the type known as "air cushion" or "ground effect machines."

Such crafts are supported upon entrapped or partially entrapped cushions of air disposed between the bottom of the vehicle and the reaction surface to which it is opposed, and the height to which the vehicle rises above the ground is determined by the rate of air induction into the air cushion chamber and the rate and mode of air escape therefrom under the marginal edges of the body of the vehicle. In some cases the vehicles utilize means whereby air is discharged downwardly and inwardly around the periphery of the vehicle in the form of a curtain or thin jet sheet, thereby forming simultaneously the air cushion supply and an air cushion "holding" or sealing means.

With such vehicles satisfactory hovering or traveling heights have not heretofore been attainable in return for reasonable power expenditures. The levitation effect attainable in such vehicles of the prior art is a function of the over-all planview dimensions of the surface of the vehicle against which the confined, superatmospheric pressured air mass or "cushion" reacts. Hence substantial heights have been heretofore attainable only in return for exorbitant power expenditures, and/or by the utilization of vehicles having relatively large planform areas. However, large vehicles of this type are not well adapted for travel over typical land surfaces, and for all practical purposes their operations are substantially confined to travel over relatively flat land or water surfaces.

It is a primary object of the present invention to provide improvements in ground effect vehicles whereby to increase the lift capabilities thereof in return for the same power input; whereby the vehicle is capable of carrying heavier loads and/or attaining greater operative heights above the reactive ground or water surface.

Another object is to provide a vehicle as aforesaid which features an improved inherent roll stability characteristic.

Another object is to provide an improved device as aforesaid whereby the vehicle may be readily "trimmed" relative to its axis of "roll," for example against an off center of gravity loading condition.

Still another object is to provide an improved vehicle as aforesaid wherein the mechanism operating to improve the lift and stability characteristics thereof may also function as a skid type undercarriage for the vehicle.

Another object is to provide an improved vehicle as aforesaid while incidentally thereto effecting reductions in the structural weight of the machine.

Other objects and advantages of the invention will appear from the description hereinbelow and the accompanying drawing wherein:

FIG. 1 is a top perspective view of a vehicle embodying the present invention;

FIG. 2 is a diagrammatic vertical transverse sectional view through one of the air cushion supply portions of a "peripheral jet" type vehicle of the present invention as suggested by line 2—2 of FIG. 1, the machine being shown at rest upon a ground surface;

FIGS. 3, 4, 5 are fragmentary sectional views corresponding to the left hand end portion of FIG. 2, illustrating operation of the mechanism of the invention in modifying the lift air flow patterns under the vehicle of FIGS. 1, 2, under different vehicle levitation and roll attitude conditions;

FIG. 6 is a view corresponding to FIG. 2 but showing application of the invention to a plenum chamber type "ground effect machine"; and FIG. 7 is a view similar to FIG. 6 but showing one form of trim tab actuating mechanism.

As shown in FIGS. 1–5, the vehicle embodying the present invention may include a bell-like body or hull as indicated generally by the reference character 10, and which carries one or more lift power plants, such as the pair of power plants as indicated generally at 12, 12. As shown therein, each power plant comprises an engine 14 which may be of any desired construction and which drives a rotatable fan assembly as indicated generally at 16, for directing air vertically downwardly through a cylindrical shroud or duct 20 delivering into a radially extended chamber 22 such as may be formed by the vehicle deck plate 24 and a bottom plate 26. The peripheral extremities of the deck and bottom plates 24, 26 are smoothly rounded and curved downwardly as shown at 28, 29 (FIG. 3) to provide therebetween a smoothly turned, and downwardly and somewhat inwardly directed, peripheral nozzle portion 30 of constricted sectional area; thereby defining a marginal or "peripheral jet" arrangement. It is to be understood that in lieu of the dual engine-fan arrangement illustrated herewith, any other preferred number of lift power plants may be employed; and that the mechanical features thereof as shown herein form no part of the present invention.

In accordance with the present invention a novel air flow control vane device is disposed as shown in the drawing herewith in spaced relation slightly below the peripheral bottom edge portion of the air duct or hull shell along each side of the craft, to automatically control the escape-air flow performance differentially from under opposite sides of the craft. Thus the devices may be provided in the form of streamlined "airfoil" sectioned ski-like "runners," designated 32—32 in the drawing herewith; said runners being preferably arranged to also function as undercarriage means for supporting the craft upon land surfaces or the like as indicated at 34, in the well known manner of a "sleigh" type undercarriage. For this purpose struts as indicated at 36 may be furnished at intervals along the runners to extend therefrom into anchored relation with the hull to provide the requisite relative support between the hull and the runners; and the struts 36 will preferably be of any suitable "shock-absorbing" type, as indicated at 38, FIGS. 3, 4, 5.

It will be appreciated that the air flowing through the chambers 22 and discharging from the jet openings 30, as indicated by the flow direction arrows of FIGS. 2–5 herewith, will be of relatively high velocity and confined to relatively small cross sectional areas at the nozzles 30, whereby the peripheral discharge of the air acts to provide a high velocity air curtain tending to seal the air lift cushion formed beneath the body 10 for efficient and effective "ground effect machine" results. However, in the case of the present invention as the cushion air from beneath the hull squeezes outwardly under the peripheral jet effect, its flow pattern is modified by the presence of the airfoil devices 32 in the airstream. Not only do they contribute to obstruction of air escape, but they also produce an increased lift effect upon the hull due to their "airfoil" sectional shapes and the lift effects thereon created by high velocity passage of escape air over the airfoil surfaces.

The escape-air control vanes 32—32 also function, in accordance with the present invention, to automatically provide inherent roll stability effects on the craft when operating at elevations above the reaction land or water surface 34. This effect is obtained as illustrated diagrammatically by FIGS. 3, 4, 5. As shown in FIG. 3, when the craft is in a substantially level attitude the flow of escape air against the airfoils 32 (at each side of the craft) provides equal increased lift effects on the vehicle, as in the manner of any effective airfoils when disposed in a relative airstream. However, whenever the craft of the present invention tends to roll as illustrated in FIG. 4 herewith, it will be seen that the airfoil 32 at the higher side of the craft is thereby disposed at a reduced angle of attack attitude relative to the airstream escaping around it from beneath the vehicle.

Furthermore, as the space between the raised airfoil and the reaction surface 34 increases, the air escaping under the raised airfoil travels at reduced velocity. These factors contribute to an immediate reduction of the air lift effect on the raised airfoil 32, while the opposite effect is being experienced by the airfoil 32 at the opposite side of the craft. This is because lowering of the opposite side of the craft results in an immediate reduction of the height of the air escape gap under the airfoil at that side of the craft, whereby the air escaping thereunder moves at an accelerated velocity against the airfoil which is now disposed at an increased angle of attack. Consequently, it will be appreciated that the mechanism of the invention functions automatically to compensate immediately for any tilting of the craft about its roll axis; thereby providing a system enhancing the inherent stability characteristics of the craft.

As illustrated in FIG. 1 of the drawing herewith the cushion-air escape control vanes 32, 32 are preferably provided with trim tabs as indicated at 40, 40, arranged to be positionally adjusted so as to modify the overall airfoil effects of the members 32, 32. Suitable mechanisms for adjustments of the trim tab attitudes are, of course, well known in the art. By way of example as shown in FIG. 7 a geared motor and crank arm unit 42 may be connected to each trim tab by means of a strut 44; the motors being controlled from the pilot cockpit, or otherwise as preferred. Hence, it will be appreciated that the operator may by suitable differential adjustments of the trim tabs at opposite sides of the machine, "trim" the craft relative to its roll axis in any desired manner.

Thus, it will be appreciated that by virtue of the present invention an improved ground effect machine is provided, featuring increased lift effects vs. power output as well as improved stability control facilities; the above mentioned features being attained by provision of means conveniently also comprising a novel form of landing skid. Hence, in the case of the present invention the skid members 32, 32 perform multiple functions; thereby providing a design system accounting for an overall weight reduction as well as an increased lift vs. power output ratio.

FIG. 6 illustrates application of the invention to a "plenum chamber" type ground effect machine; and thus it will be apparent that the same escape air flow pattern modification and increased lift effects may be designed into a variety of ground effect machine types; and that although only a few forms of the invention have been illustrated and described herein, various changes may be made therein without departing from the spirit of the invention or the scope of the following claims.

I claim:

1. A vehicle adapted to support itself above a surface by fluid pressure, comprising
   a body of open bottom form,
   said body having a perimetral skirt portion terminating in a lower marginal edge,
   means for pumping fluid into the region circumscribed by said marginal edge to form a pressure-fluid support cushion for said vehicle between the latter and said surface and whereby fluid squeezes out from under said vehicle marginal edge at high velocity,
   and fluid flow reaction means disposed in the path of fluid squeezing out from under said vehicle,
   said reaction means comprising airfoil-sectioned members held by support means below and alongside opposite sides of said vehicle and operable in response to flow of fluid therearound to provide a vehicle lift effect transmitted to said vehicle through said support means.

2. A vehicle adapted to support itself above a surface by fluid pressure, comprising
   a body of bell-like form provided with an inlet opening,
   said body having a perimetral skirt portion terminating in a lower marginal edge,
   means for pumping fluid through said inlet opening and into the region defined within said marginal edge to form a pressure-fluid support cushion for said vehicle between the latter and said surface and whereby fluid squeezes out from under said vehicle marginal edge at high velocity,
   and fluid flow reaction means disposed in the path of fluid squeezing out from under said vehicle,
   said reaction means comprising a pair of airfoil-sectioned skid members disposed to extend in parallel relation under opposite side portions of the vehicle body and comprising portions of the undercarriage of said vehicle and operable in response to flow of fluid therearound to provide a vehicle lift effect transmitted to said vehicle through the undercarriage structure.

3. A vehicle adapted to support itself above a surface by fluid pressure, comprising
   a body of bell-like form provided with an inlet opening,
   said body having a perimetral skirt portion terminating in a lower marginal edge,
   means for pumping fluid through said inlet opening and into the region defined within said marginal edge to form a pressured-fluid support cushion for said vehicle between the latter and said surface and whereby fluid squeezes out from under said vehicle marginal edge at high velocity,
   and fluid flow reaction means comprising airfoil-sectioned vane members supported by shock absorbing struts in spaced relation to said body and disposed in the path of fluid squeezing out from under said vehicle and operable in response to flow of fluid thereacross to provide a vehicle lift effect transmitted to said vehicle through said struts.

4. A vehicle adapted to support itself above a surface by fluid pressure, comprising
   an open-bottomed body provided with a fluid inlet opening,
   said body having a perimetral skirt portion terminating in a lower marginal edge,
   means for pumping fluid through said inlet opening and into the region defined within said marginal edge to form a pressured-fluid support cushion for said vehicle between the latter and said surface and whereby fluid squeezes out from under said vehicle marginal edge at high velocity,
   and an airfoil-sectioned vane member disposed in the path of fluid squeezing out from under said vehicle and operable in response to flow of fluid therearound to provide a vehicle lift effect transmitted to said vehicle and carried by said vehicle to shift its angle of attack attitude relative to the flow of fluid squeezing out from under said vehicle.

5. A vehicle adapted to support itself above a surface by fluid pressure, comprising
   a body of bell-like form provided with an inlet opening,
   said body having a perimetral skirt portion terminating in a lower marginal edge encompassing an area many times greater than the area encompassed by said inlet opening,
   means for pumping fluid through said inlet opening and into the region defined within said marginal edge to form a pressure-fluid support cushion for said vehicle between the latter and said surface and whereby fluid squeezes out from under said vehicle marginal edge at high velocity, an airfoil-sectioned control member disposed in the path of fluid squeezing out from under said vehicle and operable in response to flow of fluid therearound to provide a vehicle lift effect transmitted to said vehicle, trim-tab means operably associated with said control member, and means for positionally adjusting said trim-tab means relative to said control member for modifying the lift effects thereof.

6. A vehicle adapted to support itself above a surface by fluid pressure, comprising a body of bell-like form provided with an inlet opening, said body having a perimetral skirt portion terminating in a lower marginal edge encompassing an area many times greater than the area encompassed by said inlet opening, means for pumping fluid through said inlet opening and into the region defined within said marginal edge to form pressured-fluid support cushion for said vehicle between the latter and said surface and whereby fluid squeezes out from under said vehicle marginal edge at high velocity, fluid flow reaction means disposed in the path of fluid squeezing out from under said vehicle, said reaction means comprising a pair of airfoil-sectioned control members disposed to extend in parallel relation under opposite side portions of the vehicle body and comprising portions of the undercarriage of said vehicle and operable in response to flow of fluid therearound to provide a vehicle lift effect transmitted to said vehicle through the undercarriage structure, trim-tabs mounted on said skid members to be positionally adjustable thereon, and control means for simultaneously adjusting the trim-tabs differentially at opposite sides of said machine.

References Cited by the Examiner
UNITED STATES PATENTS 3,219,136 11/1965 Caiger et al. _____ 180—7

FOREIGN PATENTS 1,181,065 11/1964 Germany.

BENJAMIN HERSH, *Primary Examiner.*

M. S. SALES, *Assistant Examiner.*